United States Patent

[11] 3,590,231

| [72] | Inventor | Bernard P. Wenzl<br>China Lake, Calif. |
|------|----------|---------------------------------------|
| [21] | Appl. No. | 819,874 |
| [22] | Filed | Apr. 28, 1969 |
| [45] | Patented | June 29, 1971 |
| [73] | Assignee | The United States of America as represented by the Secretary of the Navy |

[54] DIGITAL SIGNAL GENERATOR USING DIGITAL DIFFERENTIAL ANALYZER TECHNIQUES
2 Claims, 7 Drawing Figs.

| [52] | U.S. Cl. | 235/197, 235/150.31, 235/150.53 |
|------|----------|---------------------------------|
| [51] | Int. Cl. | G06g 7/26, G06j 1/02 |
| [50] | Field of Search | 235/197, 150.53, 150.3, 150.31, 150.4, 150.5, 150.51, 150.52, 150.53 |

[56] References Cited
UNITED STATES PATENTS

| 3,027,078 | 3/1962 | Steele | 235/150.31 |
| 3,119,928 | 1/1964 | Skramstad | 235/150.52 X |
| 3,139,522 | 6/1964 | Voles | 235/150.31 |
| 3,148,273 | 9/1964 | Truitt et al. | 235/150.31 |
| 3,490,019 | 1/1970 | Jessen et al. | 235/150.31 X |

*Primary Examiner*—Malcolm A. Morrison
*Assistant Examiner*—Joseph F. Ruggiero
*Attorneys*—Edgar J. Brower and Roy Miller

ABSTRACT: A signal generator capable of generating triangular and sine functions in a bipolar mode. The combination of a counter, adder and accumulator register make up a computing unit which is controlled by timing pulses added accumulatively. When an accumulator register fills, the overflow pulses are accumulated in another register. By combining the outputs of the various registers, the desired functions are produced.

PATENTED JUN29 1971
3,590,231
SHEET 1 OF 4
FIG. 1.
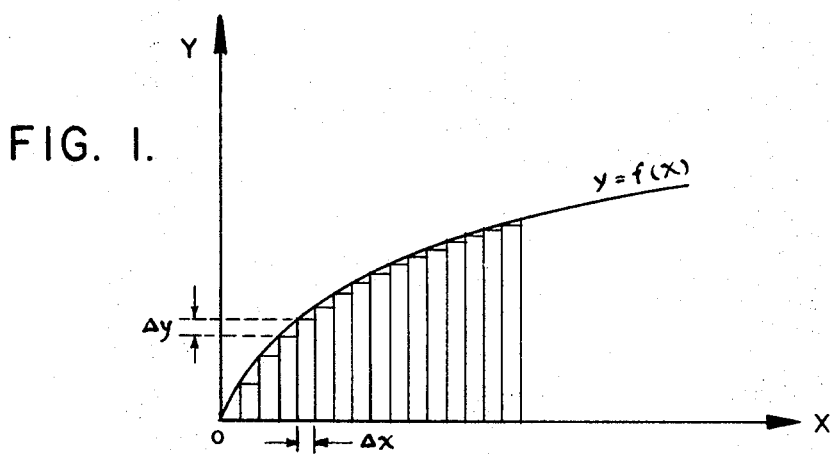
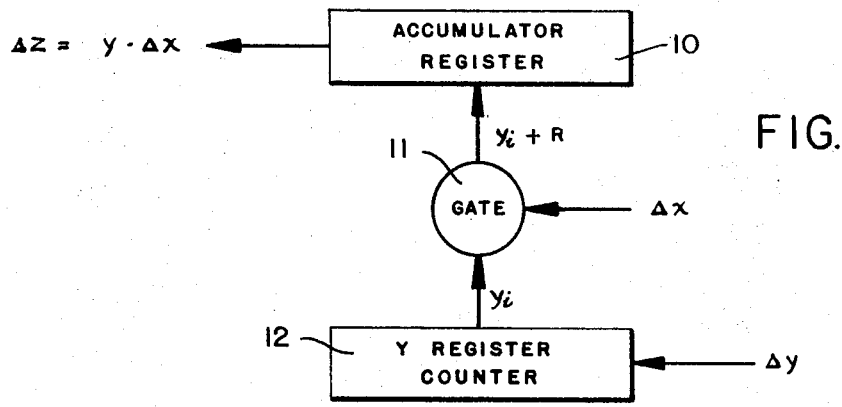
FIG. 2.
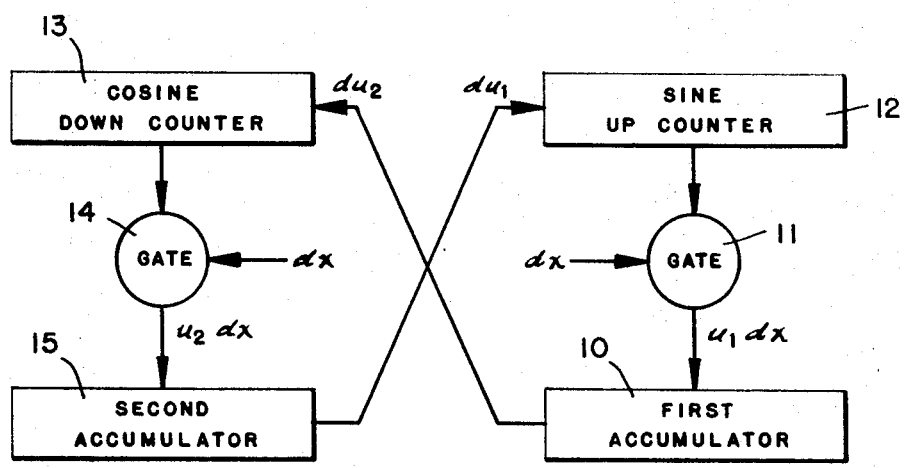
FIG. 3.
INVENTOR.
BERNARD P. WENZL
BY
ROY MILLER
ATTORNEY.

DIGITAL SIGNAL GENERATOR USING DIGITAL DIFFERENTIAL ANALYZER TECHNIQUES

GOVERNMENT INTEREST

The invention described herein may be manufactured and used by or for the Government of the United States of America for governmental purposes without the payment of any royalties thereon or therefor.

BACKGROUND OF THE INVENTION

One technique used to obtain a digital representation of a sine wave is sampling. An analog signal is sampled and the sample applied to a digital to analog converter. The resulting output is a digital number or level corresponding to the amplitude of the sine wave at the time the sample was taken. The accuracy of this technique is severely limited, however, by the sample, the accuracy of available digital to analog converters and the noise present in the analog signal. It is apparent that the sampling technique requires a large number of samples per cycle to faithfully reproduce a sine wave in digital form.

SUMMARY OF THE INVENTION

In accordance with the present invention, digital differential analyzer techniques are used to generate sine, cosine and triangular functions. The combination of a counter, adder and accumulator register make up the computing unit of a digital differential analyzer. The computing units which can be composed of any of a number of digital integrated or discrete component circuits such as Texas Instrument's J-K Flip-Flops, and, where required, negative AND gates are in turn controlled by timing pulses, and with each pulse the contents of the counter are added cumulatively to the contents of the register. The register fills up and puts out an overflow or carry. The overflow pulses from various registers are then combined to produce sine and cosine functions.

BRIEF DESCRIPTION OF THE DRAWING

FIG. 1 is a graph of rectangular integration of the function $y=fAQx$);

FIG. 2 is a block diagram of a basic digital differential analyzer;

FIG. 3 is a block diagram of a digital sine and cosine generator;

DESCRIPTION OF THE PREFERRED EMBODIMENT

Figure 4:
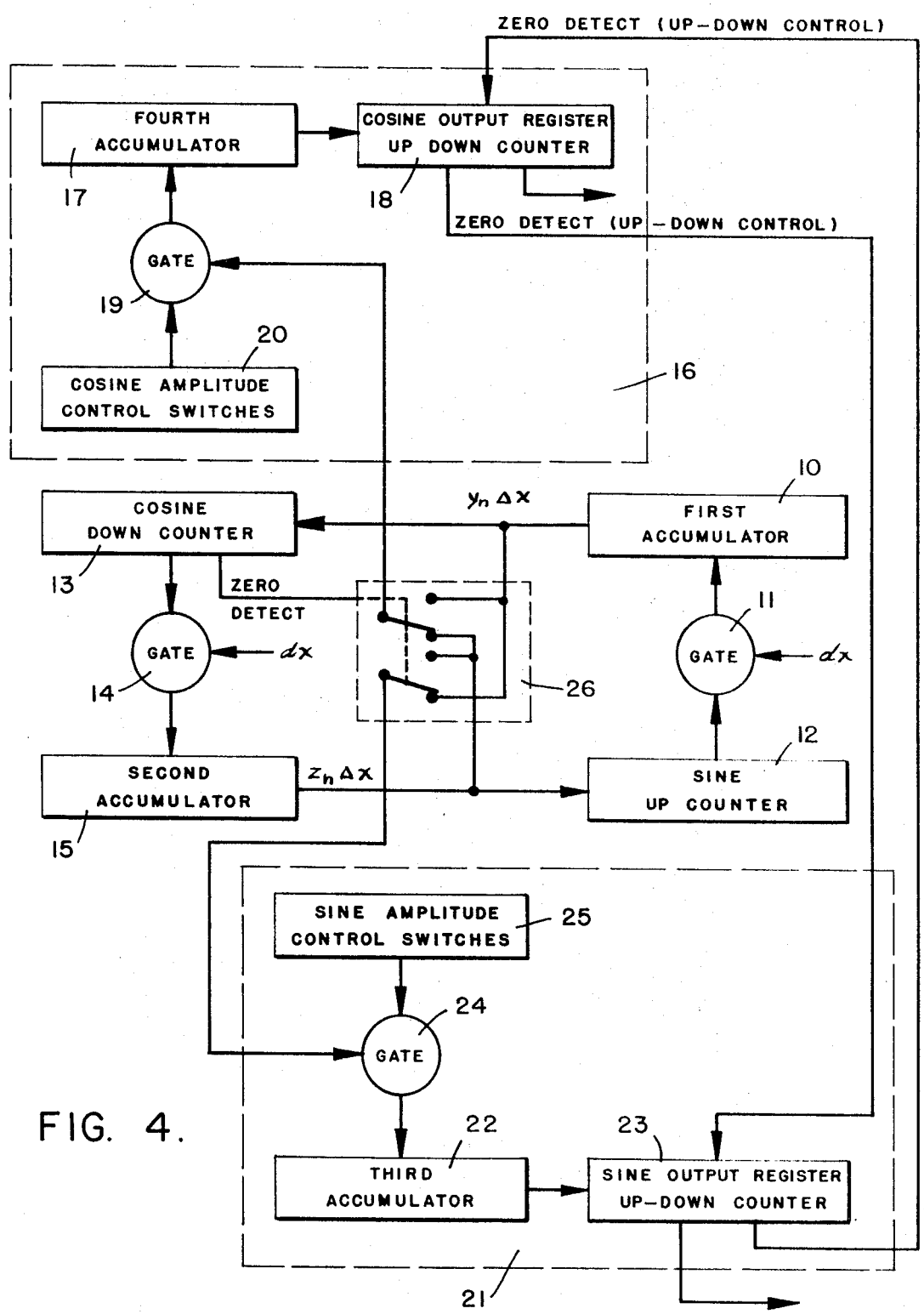
FIG. 4 is a block diagram of a digital sine and cosine generator having amplitude control.

The integral of a function $y=f(x)$ is represented by the area bounded by the curve of the function. By the integration method of Euler, the integral can be approximated by the sum of the areas of incremental rectangles under the curve.

Referring to FIG. 1, if $y$ is the height of the incremental rectangles and $\Delta x$ is the width of the incremental rectangles, the value of the integral is:

$$A=\int_{x_D}^{x} ydx = \lim_{\Delta x \to 0} \sum_{i=1}^{n} y_i \Delta x_i + y_o \quad (1)$$

$$A \approx \sum_{i=1}^{u} y_i \Delta x_i + y_o \quad (2)$$

where $y_0$ is the initial value of $y=f(x)$ and $\Delta x_{i+1} - x_i$ is an increment of the independent variable.

If we assume that the incremental value of the independent variable is $\Delta x=1$, the expression for the integral of equation (1) becomes:

$$A = \sum_{i=1}^{u} y_i + y_o \quad (3)$$

To calculate the value of the integral, it becomes sufficient to sum the heights of all the rectangles of unit width.

The ordinate values of the rectangle may be represented as:

$y_0 = y_0$
$y_1 = y_0 + \Delta y_1$
$y_2 = y_1 + \Delta y_2$
.
.
.
$y_i = y_{i-1} + \Delta y_i = y_0 + \Delta y_1 + \Delta y_2 + \cdots \Delta y_i$ $$y_i = y_0 + \sum_{k=1}^{i} \Delta y_k \quad (4)$$

From equations (3) and (4) with $\Delta x_i = 1$, it can be seen that the block diagram shown in FIG. 2 will implement the integration. Consider the function $dz=ydx$. Integrating both sides we obtain:

$$Z = \int y dx \approx \sum_{i=1}^{u} y_i \Delta x + y_o \quad (5)$$

The accepted practice in the field of digital analyzers, and the practice employed in the drawings of this application, is to indicate a parallel connection by an arrow abutting a long side of a register block. Likewise, an arrow abutting a short side of a register block indicates a serial connection.

Referring to FIG. 2, $y_o$ is the initial value of Y register 12. The $\Delta y$'s must be unity increments in a digital system of ones and zeros. Therefore, if register 12 is a counter as shown, the counter counts the $\Delta y$ increments and forms $$y_i = y_o + \sum_{k=1}^{i} \Delta y_k,$$

from equation (4).

Since $\Delta x$ is also unity in a digital system, each time a $\Delta x$ pulse is received, $y_i$ is gated by gate 11 to register 10. If register 10 is an accumulator, as shown, $y_i$ is added or accumulated to register 10. Accumulator register 10 then accumulates the product $y_i \Delta x = y_i$ where $\Delta x = 1$. The accumulation of these products forms $$Z = \sum_{i=1}^{u} y_i + y_o,$$

from equation (3). Binary multiplication normally requires a double-length register, however, since true multiplication is not being performed, the use of a double-length accumulator register can be avoided.

Since $\Delta x=1$ the product $y_i \Delta x$ equals $y_i$ and the accumulator register need only be as long as the counter to receive the minor product $y_i \Delta x$. However, as successive products of $y_i \Delta x$ are accumulated, the accumulator must overflow. The overflow will be a carry from the minor part of the product into the major part. In this binary system, the carry can only be one, and the major part can change at most by one with each clock pulse.

Referring to FIG. 3 if counter 13 receives these carries as $\Delta z_i$, the counter will form the sum $$z = \sum_{i=1}^{u} \Delta z_i + z_o$$

from equation (4).

$$u_1 = \text{sine } x \quad (6)$$

$$u_2 = \text{cosine } x \quad (7)$$

then $$du_1 = \text{cosine } x \, dx \quad (8)$$

$$du_2 = -\text{sine } x \, dx \quad (9)$$

Substituting (6) and (7) into (8) and (9):

$$du_1 = u_2 dx \quad (10)$$

$$du_2 = -u_1 \quad (11)$$

The implementation of equations (10) and (11) is shown in FIG. 3, where the counting of $du_1$ and $du_2$ forms $u_1 = \text{sine } x$ and $u_2 = \cos x$ respectively. The negative sign for $du_2 = -u_1 \, dx$ is taken care of by making counter 13 a down counter. To account for initial conditions, cosine register 13 would have to be maximum initially and sine register 12 zero initially.

In order to minimize error, the program is reset at the end of each quarter cycle and only quarter waves are generated. Since only quarter waves are generated, sine counter 12 is an up counter and cosine counter 13 is a down counter. The quarter waves generated are put together using appropriate switching to form full cycles.

Due to the fact that the output pulses of first accumulator 10 are used as the input to cosine down counter 13, and the output of second accumulator 15 is used as the input to sine up counter 12, an error results. This error is known as roundoff error. Studies have shown that the magnitude of the roundoff error reaches unacceptable limits after the computation of only a few values of the sine and cosine function. However, if a permanent bias is set into first and second accumulator registers 10 and 15, the magnitude of the roundoff error is affected considerably. By preloading an initial value into each of these registers of one-half their maximum capacity, the average value of the roundoff error is reduced to zero.

The error remaining after this roundoff error correction is known as the truncation error, which arises from the fact that the Euler forms of integration results in summing a series of crude approximations in order to compute successive values of the function. Studies, undertaken with the aid of a digital computer, indicate that a 14-bit sine function can be generated from 0 to $\pi/2$ radians, with an error not exceeding the value of the least significant bit, if the roundoff correction is incorporated into the system.

In addition to preloading accumulator registers 10 and 15, cosine register 13 must be preloaded to its maximum value. With each carry from first accumulator 10, cosine register 13 counts down until a zero count is reached. When a zero is detected in cosine register 13, a detect pulse can be obtained each quarter cycle as the cosine goes to zero. This detect pulse can be used to set sine and cosine registers 12 and 13 to their initial conditions, to switch the inputs to an up-down counter from $du_2$ to $du_1$ and to switch said up-down counter from count up to count down or vice versa every quarter cycle. Simultaneously, sine register 12, which has an initial count of zero, counts up with each carry from second accumulator 15 until a maximum count is reached. At this time, sine and cosine registers 12 and 13, and first and second accumulator 10 and 15 are reset to their initial conditions and the sequence is repeated.

Amplitude control of the generated functions is attained through the use of additional computing units 16 and 21 as shown in FIG. 4.

The desired maximum amplitude is set on cosine amplitude control switch 20 and sine amplitude control switch 25. With each carry, the contents of switches 20 and 25 are accumulated in fourth accumulator 17 and third accumulator 22, respectively. When registers 17 and 22 fill up, they generate a spillover or carry, causing cosine output register up-down counter 18 and sine output register up-down counter 23 to count up or down, whichever is required. The result is that the maximum amplitude generated will equal the setting on the switches.

Figure 5:
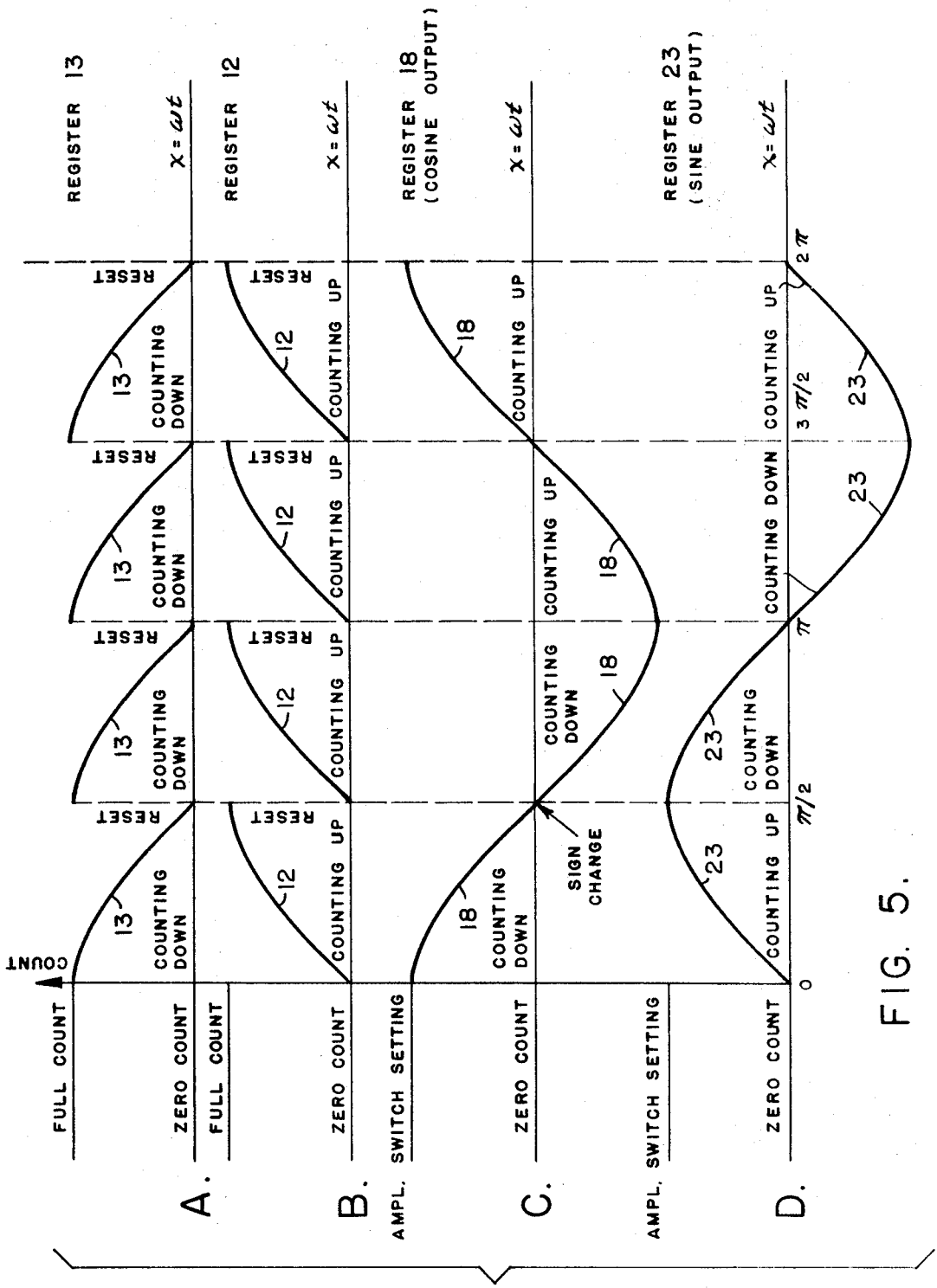
FIG. 5 is a graph showing various waveforms of the generator shown in FIG. 4.

In addition to controlling amplitude, the fact that counters 18 and 23 are commanded to count up at certain times, and down at other times, results in producing continuous sine and cosine functions as shown in FIG. 5.

FIG. 5A shows the output of cosine down counter 13. Every quarter cycle counter 13 is reset to its maximum value. FIG. 5B shows the output of sine up counter 12. Every quarter cycle counter 12 is reset to zero. The abscissa of FIG. 5 is $x=wt$.

When a zero is detected in cosine register 13, a "zero detect" pulse is obtained each quarter cycle. This "zero detect" pulse actuates switching network 26 so that: the output of first accumulator 10 is fed to gate 19 and the output of second accumulator 15 is fed to gate 24 during the first and third quarters of a cycle; and the output of first accumulator 10 is fed to gate 24 and the output of second accumulator 15 is fed to gate 19 during the second and fourth quarters of a cycle. In addition, a "zero detect" on the output of register 18 reverses the up-down sequence of counter 23; and a "zero detect" on the output of register 23 reverses the up-down sequence of counter 18. The outputs of registers 18 and 23 are shown in FIGS. 5C and 5D respectively.

In order to generate one cycle approximately 100,000 computations must be made. The frequency of the function generated can therefore be varied by controlling the rate at which computations are made by changing the frequency of the "$dx$" pulses into gates 11 and 14, the frequency of the output can be changed.

Figure 6:
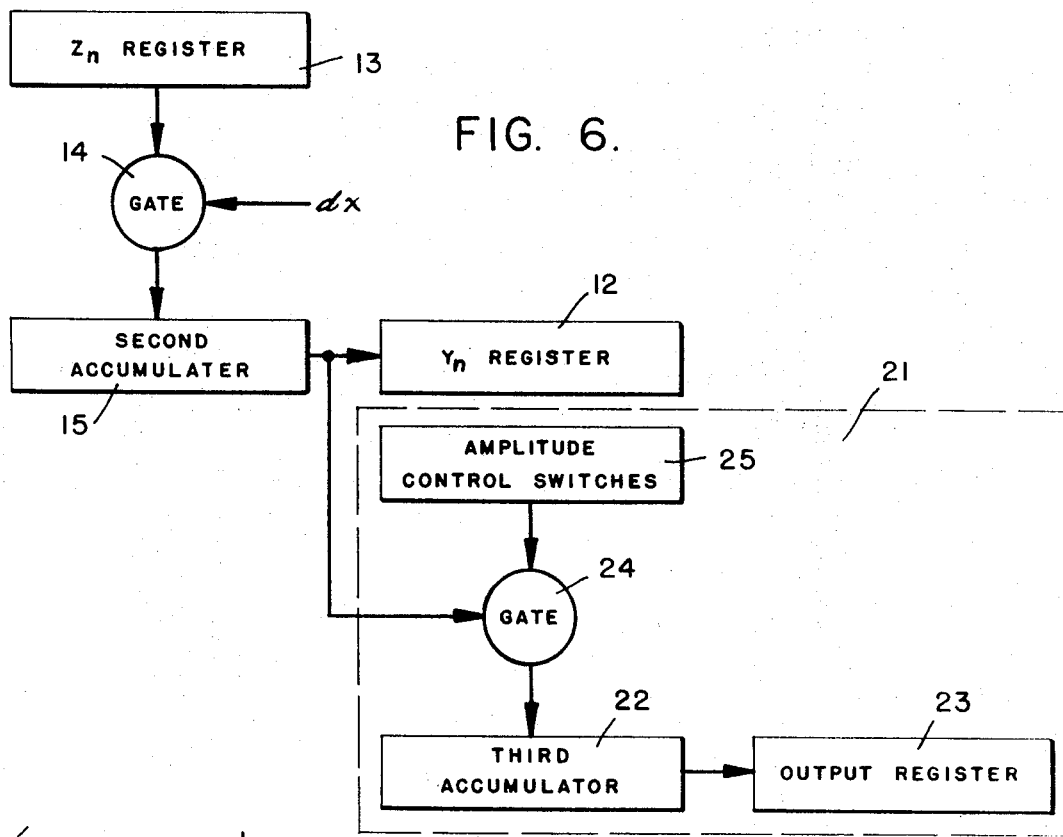
FIG. 6 is a block diagram of a digital triangular wave generator.

A digital triangular function generator can be produced by arranging the computing units as shown in FIG. 6.

An initial value of .707 is preset into $Z_n$ register 13, resulting in an input to gate 24 of pulses having a rate 0.707 times that of timing pulses "$dx$" into gate 14. This results in a function having a period the same as the sine wave previously considered. Therefore, the same frequency control network that was used for the sine and cosine functions can be used here.

Figure 7:
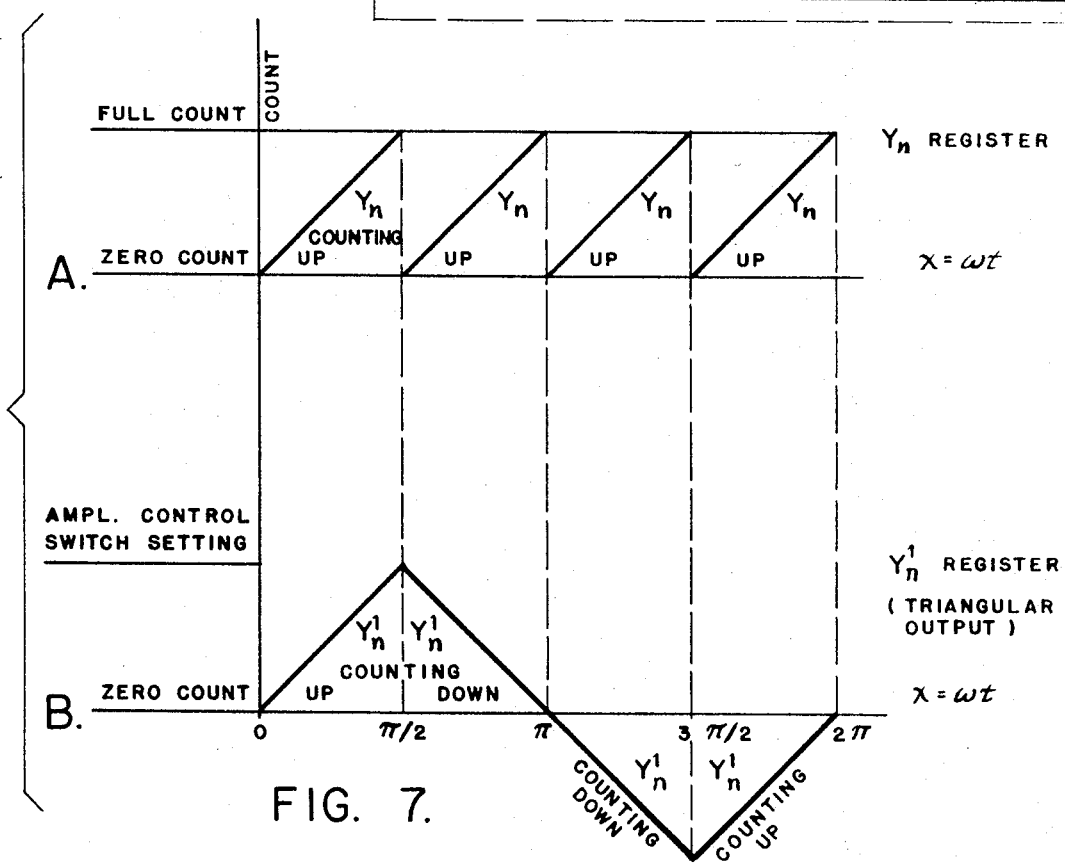
FIG. 7 is a graph showing various waveforms of the generator shown in FIG. 6.

Referring to FIG. 7, the triangular function waveforms are shown. The abscissa of the graphs is $x=wt$. FIG. 7A shows the output of $Y_n$ register 12. Note that at the end of each carry, register 12 is reset to zero. FIG. 7B shows the output of register 23. Note that after appropriate switching, via gate 24, a triangular waveform 15 produced.

What I claim is:
1. A digital signal generator comprising:
clock means;
a first accumulator register having a serial output and a parallel input;
an up counter having a parallel output and a serial input;
means for gating the parallel output of the up counter to the parallel input of the first accumulator register in response to the clock means;
a second accumulator register having a parallel input and an output serially connected to the input of the up counter;
a down counter having a parallel output and an input serially connected to the output of the first accumulator register;
means for gating the parallel output of the down counter to the parallel input of the second accumulator register in response to the clock means; so that
a quadrant of a sine wave will appear at the parallel output of the up counter and a quadrant of a cosine wave will appear at the parallel output of the down counter;
first amplitude control means for producing a first preset amplitude;
a third accumulated register having a parallel input and a serial output;
means for detecting when the parallel output of the down counter is zero;
means for gating the output of the first amplitude control means to the parallel input of the third accumulator register in alternate response to;
the serial output of the second accumulator register until the parallel output of the down counter reaches zero, and the serial output of the first accumulator register until the parallel output of the down counter reaches zero.

a first up-down counter having a parallel output and an input serially connected to the output of the third accumulator register;

second amplitude control means for producing a second preset amplitude;

a fourth accumulator register having a parallel input and a serial output;

means for gating the output of the second amplitude control means to the parallel input of the fourth accumulator register in alternate response to;

the serial output of the first accumulator register until the parallel output of the down counter reaches zero, and the serial output of the second accumulator register until the parallel output of the down counter reaches zero;

a second up-down counter having a parallel output and an input serially connected to the output of the fourth accumulator register;

means for detecting a zero at the output of the second up-down counter;

means for reversing the up-down mode of the first up-down counter in response to the zero detected at the output of the second up-down counter;

means for detecting a zero at the output of the first up-down counter;

means for reversing the up-down mode of the second up-down counter in response to the zero detected at the output of the first up-down counter; so that a sine wave will appear at the parallel of the first up-down counter and a cosine wave will appear at the parallel output of the second up-down counter.

2. A digital signal generator as set forth in claim 1 and further including:

means for disconnecting the serial input to the down counter; and means for constantly loading the down counter so that the serial output of the second accumulator is 0.707 times the clock rate;

to produce a triangular wave at the parallel output of the first up-down counter.